US012051280B2

(12) United States Patent
Vukovic et al.

(10) Patent No.: US 12,051,280 B2
(45) Date of Patent: Jul. 30, 2024

(54) ROAD USAGE CHARGING SYSTEM VALIDATION

(71) Applicant: FORD GLOBAL TECHNOLOGIES, LLC, Dearborn, MI (US)

(72) Inventors: Ivan Vukovic, Birmingham, MI (US); Krishna Bandi, Farmington Hills, MI (US); Sathyanarayana Chary Palakonda, Northville, MI (US); Syed Amaar Ahmad, Canton, MI (US); Joseph Zane, Birmingham, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 18/057,927

(22) Filed: Nov. 22, 2022

(65) Prior Publication Data

US 2024/0169765 A1 May 23, 2024

(51) Int. Cl.
*G07B 15/06* (2011.01)
*G07B 15/02* (2011.01)

(52) U.S. Cl.
CPC ........... *G07B 15/063* (2013.01); *G07B 15/02* (2013.01)

(58) Field of Classification Search
None
See application file for complete search history.

(56) References Cited

U.S. PATENT DOCUMENTS

| | | | | |
|---|---|---|---|---|
| 5,767,505 | A | 6/1998 | Mertens et al. | |
| 2022/0092884 | A1 | 3/2022 | Basir et al. | |
| 2023/0298388 | A1 * | 9/2023 | Van Duren | H04L 67/12 705/71 |

FOREIGN PATENT DOCUMENTS

| | | | |
|---|---|---|---|
| CN | 108230468 | A | 6/2018 |
| CN | 110225534 | B | 7/2022 |

* cited by examiner

*Primary Examiner* — Suezu Ellis
(74) *Attorney, Agent, or Firm* — Joseph Zane; Brooks Kushman P.C.

(57) ABSTRACT

Performing validation of road usage charging (RUC) systems is provided. A hardware processor of a vehicle receives, from an HMI of the vehicle, input to enter into a testing mode in which a test of RUC functionality of the vehicle is to be performed. In the testing mode, RUC charges are computed for a route from a start location to an end location, based on map and fees information for the test. One or more reports of the charges are generated for verification of the RUC functionality, the charges being verifiable based on the route and the map and fees information being defined for the test.

19 Claims, 12 Drawing Sheets

ROAD USAGE CHARGING SYSTEM VALIDATION

TECHNICAL FIELD

Aspects of the disclosure generally relate to validation of road usage charging systems.

BACKGROUND

Road usage charging (RUC), sometimes referred to as vehicle miles traveled (VMT) fees or mileage-based user fees (MBUF), is a policy whereby motorists pay for use of the roadway network as a function of distance traveled. VMT may not be the only input to fee computation, as time-of-day or time spent on the road may be an input to the fee calculation as well.

As with tolling, RUC is a direct user fee that supports a "user pays" principle of transportation funding, as well as the notion of managing road networks as utilities. Whereas toll systems are generally deployed on one or several facilities, such as an expressway corridors, bridges, or tunnels, road usage charges may apply to all roads in a defined jurisdiction or geography at all times. RUC can be implemented using a wide range of approaches, from paper licenses and odometer readings to automated technologies, such as in-vehicle devices and telematics systems built into vehicles.

SUMMARY

In one or more illustrative examples, a vehicle for performing validation of RUC systems is provided. The vehicle includes a human machine interface (HMI). The vehicle further includes a hardware processor, programmed to receive input, from the HMI, to enter into a testing mode in which a test of RUC functionality of the vehicle is to be performed, in the testing mode, compute RUC charges for a route from a start location to an end location, based on map and fees information for the test, and generate one or more reports of the charges for verification of the RUC functionality, the charges being verifiable based on the route and the map and fees information defined for the test.

In one or more illustrative examples, a method for performing validation of RUC systems is provided. The method includes receiving, to a hardware processor of a vehicle, from an HMI of the vehicle, input to enter into a testing mode in which a test of RUC functionality of the vehicle is to be performed; in the testing mode, computing RUC charges for a route from a start location to an end location, based on map and fees information for the test; and generating one or more reports of the charges for verification of the RUC functionality, the charges being verifiable based on the route and the map and fees information being defined for the test.

In one or more illustrative examples, a non-transitory computer readable medium includes instructions for performing validation of RUC systems that, when executed by a hardware processor of a vehicle, cause the vehicle to perform operations including to receive, from an HMI of the vehicle, input to enter into a testing mode in which a test of RUC functionality of the vehicle is to be performed, the input including specification of a uniform resource identifier (URI) of a certification server; in the testing mode, compute RUC charges for a route from a start location to an end location, based on map and fees information for the test, wherein the route traverses a plurality of charging domains; generate one or more reports of the charges for verification of the RUC functionality, the charges being verifiable based on the route and the map and fees information being defined for the test, wherein the one or more reports include an itemized report, the itemized report indicating amounts owed for traversal by the vehicle of road segments within each of the charging domains; and send the one or more reports to the URI of the certification server for validation instead of sending the one or more reports to a RUC service provider.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With growing interest in sustainable and equitable methods of paying for maintenance and operations of transport infrastructure, and in the face of declining fuel tax revenues, worldwide interest in road usage charging programs has grown significantly. Thus, it may be desirable to provide enhanced capabilities for determining usage of the infrastructure.

The same fee may not apply to all road infrastructure. Therefore, it may be useful for the vehicle to obtain combined location and fee information to properly compute a RUC. This location and fee information may have a wide range of fidelity. Agencies or chargers may provide relatively coarse location information to which a certain fee applies; however, it is unlikely that the agencies will provide fee information for every road and street. Instead, one approach is to utilize geo-polygons that define a particular fee regime. In addition to polygons or areas, corridors may be specified since chargers have expressed desire for separately pricing specific roads.

While charging geometries may not be at the finest level of geographic detail, the partitioning may still allow third parties opportunities to infer trip patterns from individual users. Also, chargers may require information with respect to how much distance was traveled on each pricing geometry (e.g., charging jurisdiction) to appropriate the correct funds to the geometry.

Aspects of the disclosure relate to performing testing to identify whether the RUC systems are functioning properly. These approaches may include both a controlled environment where the vehicle is brought to a certification facility as well as vehicle performing a self-test in the field. Further details of the approaches are discussed in detail herein.

Figure 1:
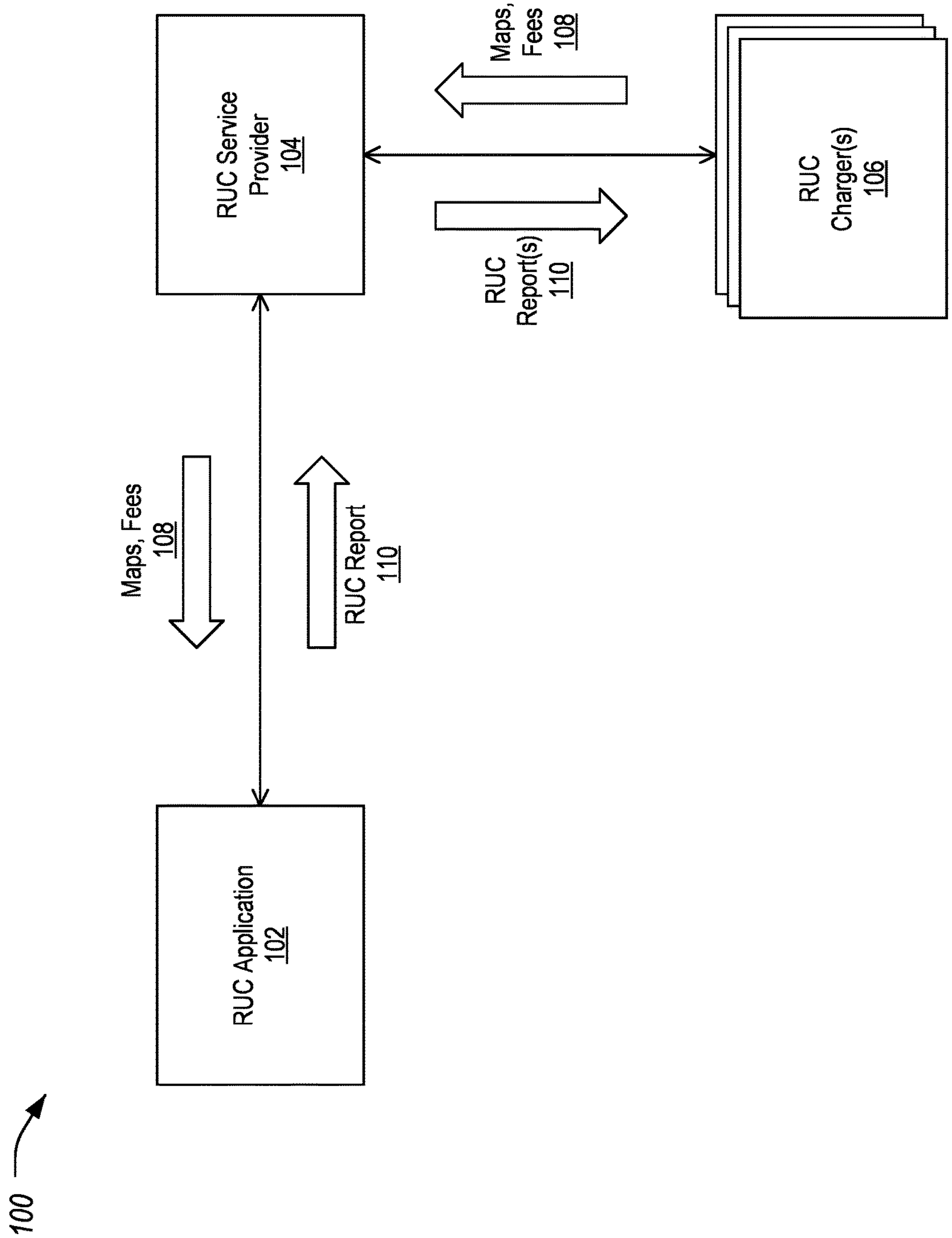
FIG. 1 illustrates an example reference architecture of a complete RUC system.

FIG. 1 illustrates an example reference architecture of a complete RUC system 100. As shown, the system 100 includes a RUC application 102, in communication with a RUC service provider 104. In turn, the RUC service provider 104 is in communication with one or more RUC chargers 106. Although not shown, it should be noted that multiple RUC service providers 104 may exist in which case different RUC applications 102 may connect to different RUC service providers 104. The RUC chargers 106 may be configured to provide map and fees information 108 to the RUC service provider 104. The RUC service provider 104 may receive the map and fees information 108 from one or more of the RUC chargers 106 to forward along to the RUC application 102. The RUC application 102 may provide RUC reports 110 to the RUC service provider 104, which in turn the RUC service provider 104 may forward to the appropriate RUC charger(s) 106. In some examples, the RUC report 110 forwarded by the RUC service provider 104 may be a compressed version of the report that was sent by the RUC application 102 to the RUC service provider 104.

The map and fees information 108 may include information descriptive of the fees owed per charging area and/or charging domain that a vehicle may traverse. This may include, in an example, data tables descriptive of the road geometry of the domains and fee tables for traversal of the indicated areas. The map and fees information 108 may further include information with respect to which roadways incur a charge for traversal and which do not. The map and fees information 108 may further include information with respect to which roads are private roads, which are dirt roads, as well as which may incur a charge differently or not at all as compared to other roadways. The map and fees information 108 may also indicate which are RUC-exempted roads/lanes, and which areas are off-road locations that may not be included in distance traveled measurements. Accordingly, the map and fees information 108 may allow the RUC application 102 to compute a total charge owed by the vehicle. Periodically, or triggered by an event, the RUC application 102 may send the RUC report 110 to the RUC service provider 104.

The RUC report 110 may include information to allow for the vehicle to be charged. This may include, for example, an account identifier to be charged the amount owed for the reporting period detailed by the RUC report 110. The account identifier may identify, as some examples, an account of the occupant corresponding to the vehicle and/or an account of an occupant of the vehicle. The RUC report 110 may also include other information, such as a total distance traveled and/or a distance traveled per charger domain. Based on the RUC report 110, the RUC service provider 104 may charge the vehicle and may provide funding to the different RUC chargers 106 corresponding to the fees incurred in each charging domain.

Figure 2:
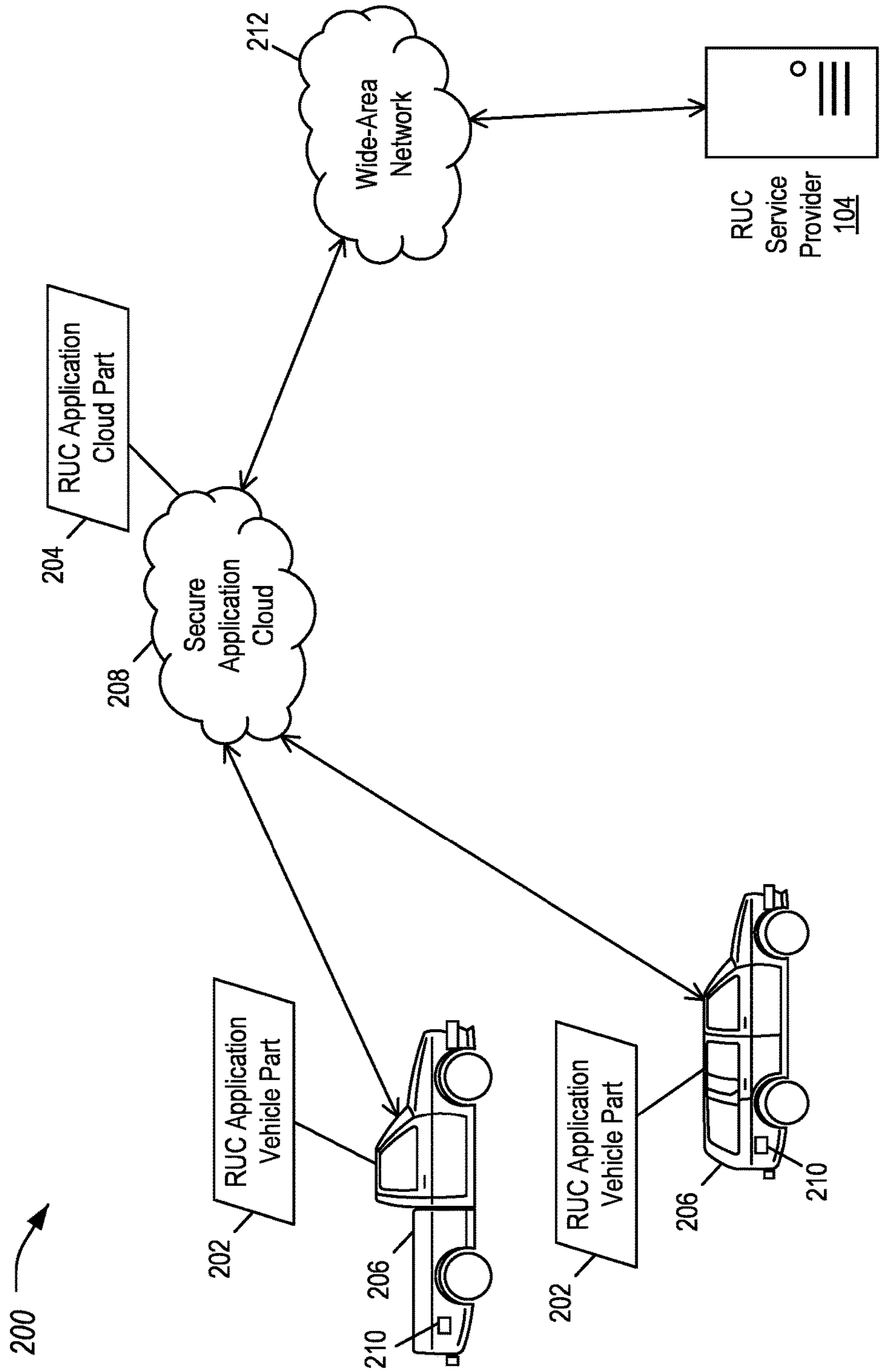
FIG. 2 illustrates an example RUC architecture for performing validation with the RUC application implemented as a RUC application vehicle part and a RUC application cloud part.

FIG. 2 illustrates an example RUC architecture 200 for performing validation with the RUC application 102 implemented as a RUC application vehicle part 202 and a RUC application cloud part 204. The RUC application vehicle part 202 may be executed by the controllers of a vehicle 206. The RUC application cloud part 204 may be executed by one or more servers or other computing devices of a secure application cloud 208.

The vehicle 206 may be any of various types of automobile, crossover utility vehicle (CUV), sport utility vehicle (SUV), truck, recreational vehicle, or other mobile machine for transporting people or goods. Such vehicles 206 may be human-driven or autonomous. In many cases, the vehicle 206 may be powered by an internal combustion engine. As another possibility, the vehicle 206 may be a battery electric vehicle (BEV) powered by one or more electric motors. As a further possibility, the vehicle 206 may be a hybrid electric vehicle (HEV) powered by both an internal combustion engine and one or more electric motors. As the type and configuration of vehicle 206 may vary, the capabilities of the vehicle 206 may correspondingly vary. As some other possibilities, vehicles 206 may have different capabilities with respect to passenger capacity, towing ability and capacity, and storage volume. For title, inventory, and other purposes, vehicles 206 may be associated with unique identifiers, such as vehicle identification numbers (VINs).

The vehicle 206 may include a plurality of controllers (not shown) configured to perform and manage various vehicle 206 functions under the power of the vehicle battery and/or drivetrain. One or more data buses may include various methods of communication available between the controllers, as well as between a telematics control unit (TCU) 210 and the controllers. Using the controllers, the TCU 210 may be able to monitor various information, such as the current location of the vehicle 206 (e.g., via a global navigation satellite system (GNSS)), the distance traveled by the vehicle 206, the road and/or lane being traversed by the vehicle 206, progress along a route being traversed by the vehicle 206, etc.

The TCU 210 may include network hardware configured to facilitate communication between the controllers of the vehicle 206 and with other devices of the system 100. For example, the TCU 210 may include or otherwise access a modem configured to facilitate communication over the secure application cloud 208 and/or a wide-area network 212 such as the Internet. The TCU 210 may, accordingly, be configured to communicate over various protocols, such as over a network protocol (such as Uu or cellular network interface). The TCU 210 may, additionally, be configured to communicate over a broadcast peer-to-peer protocol (such as PC5), to facilitate cellular vehicle-to-everything (C-V2X) communications with devices such as other vehicles 206 or road-side units (not shown). It should be noted that these protocols are merely examples, and different peer-to-peer and/or cellular technologies may be used.

The secure application cloud 208 may include various private computing resources configured to provide services to the vehicle 206. In an example, the vehicle 206 may utilize the TCU 210 to connect to a network access point name (APN) for vehicle applications that utilize remote computing assistance. The secure application cloud 208 may connect to the wide-area network 212 through a gateway, providing access to other devices on the wide-area network 212, such as the RUC service provider 104.

In FIG. 2 the interface between the RUC application 102 and the RUC service provider 104 is implemented on both the vehicle 206 and the secure application cloud 208. Collectively, the RUC application vehicle part 202 and the RUC application cloud part 204 may perform the operations of the RUC application 102. This may include to receive the map and fees information 108 from the RUC service provider 104 and send the RUC reports 110 or other information related to the vehicle's roadway usage to the RUC service provider 104.

Figure 3:
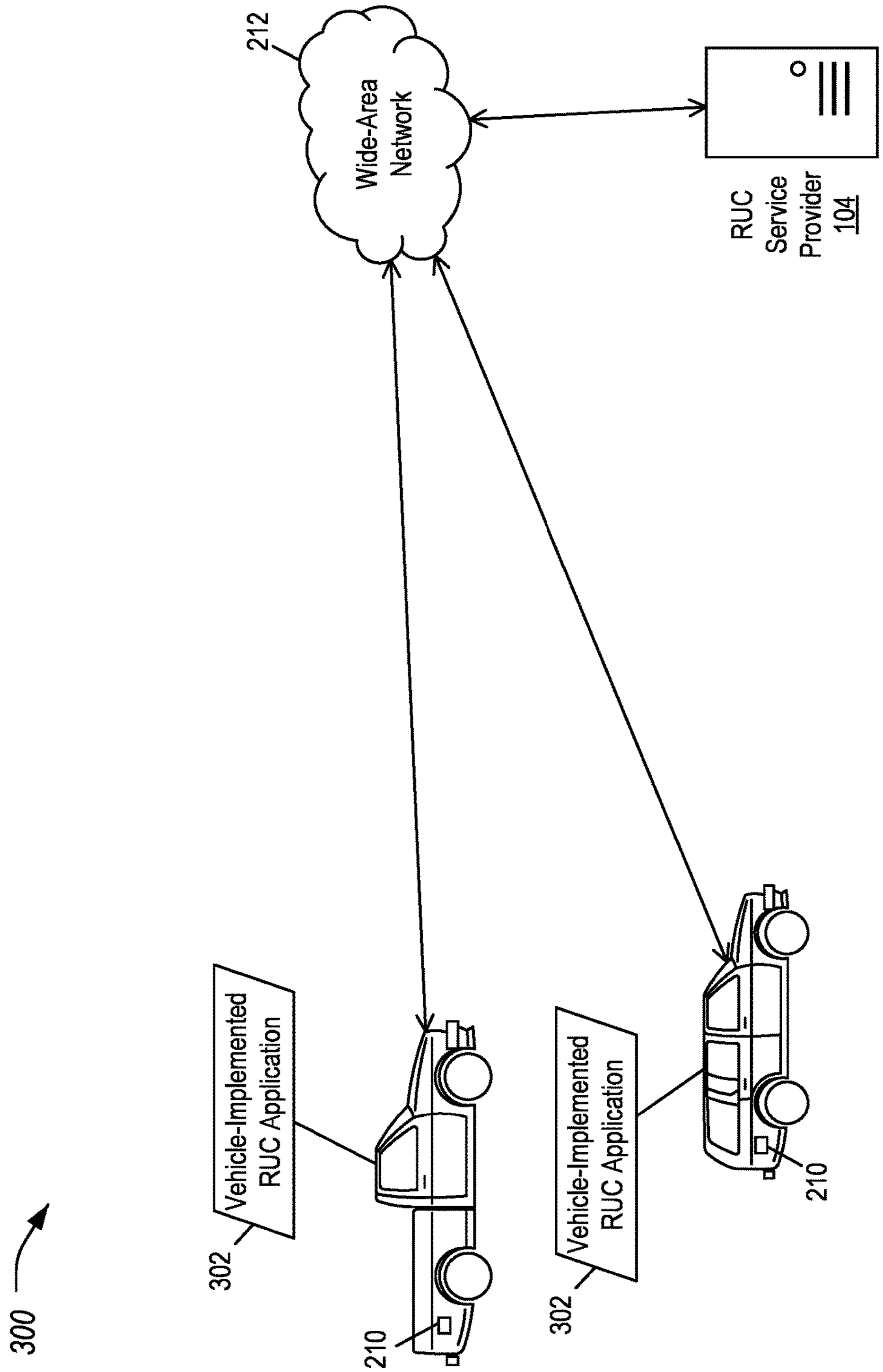
FIG. 3 illustrates an alternate example RUC architecture for performing validation with the RUC application implemented as a vehicle-implemented RUC application.

FIG. 3 illustrates an alternate example RUC architecture 300 for performing validation with the RUC application 102 implemented as a vehicle-implemented RUC application 302. Similar to the RUC application vehicle part 202, the vehicle-implemented RUC application 302 may be executed by the controllers of the vehicle 206. In the alternative architecture shown in FIG. 3, the interface between the RUC application 102 and the RUC service provider 104 is implemented on the vehicle 206 alone. Here, the vehicle 206 may connect to the wide-area network 212 to access the RUC service provider 104, without using the services of the secure application cloud 208.

In either RUC architecture 200 and 300, the RUC application 102 corresponding to an individual vehicle 206 may collect, over a time period, total distance traveled in each charging domain. Based on the fee table provided by the RUC service provider 104 in the map and fees information 108, RUC application 102 may compute the internal RUC report 110. For instance, the amount owed may be computed as the distance traveled in the charging domain, times the fee for travel per unit distance. Or, the amount owed may be computed as the time spent in the charging domain, times the fee for presence per unit time. It should also be noted that the internal RUC reports 110 may discount private roads, dirt roads, RUC-exempted roads/lanes as marked on the map and off-road drives from the distance traveled measurements, if so specified by the map and fees information 108. An example internal RUC report 110 is shown in Table 1.

TABLE 1

| Internal RUC Report | | |
|---|---|---|
| User Account<br>Charge Domain | Account X<br>Amount owed | Distance traveled |
| C1 | X1 | M1 |
| C2 | X2 | M2 |
| . . . | . . . | . . . |
| Cn | Xn | Mn |

A user having "Account X" may send the internal RUC report 110 to the RUC service provider 104 conveying the information from Table 1. However, the information included in the internal RUC report 110 may be sufficiently descriptive that it could be used to deconstruct the user's trip pattern. For example, using knowledge of the road geometry of the charge domains, as well as the distance traveled information, a best fit travel path could be reconstructed.

Figure 4:
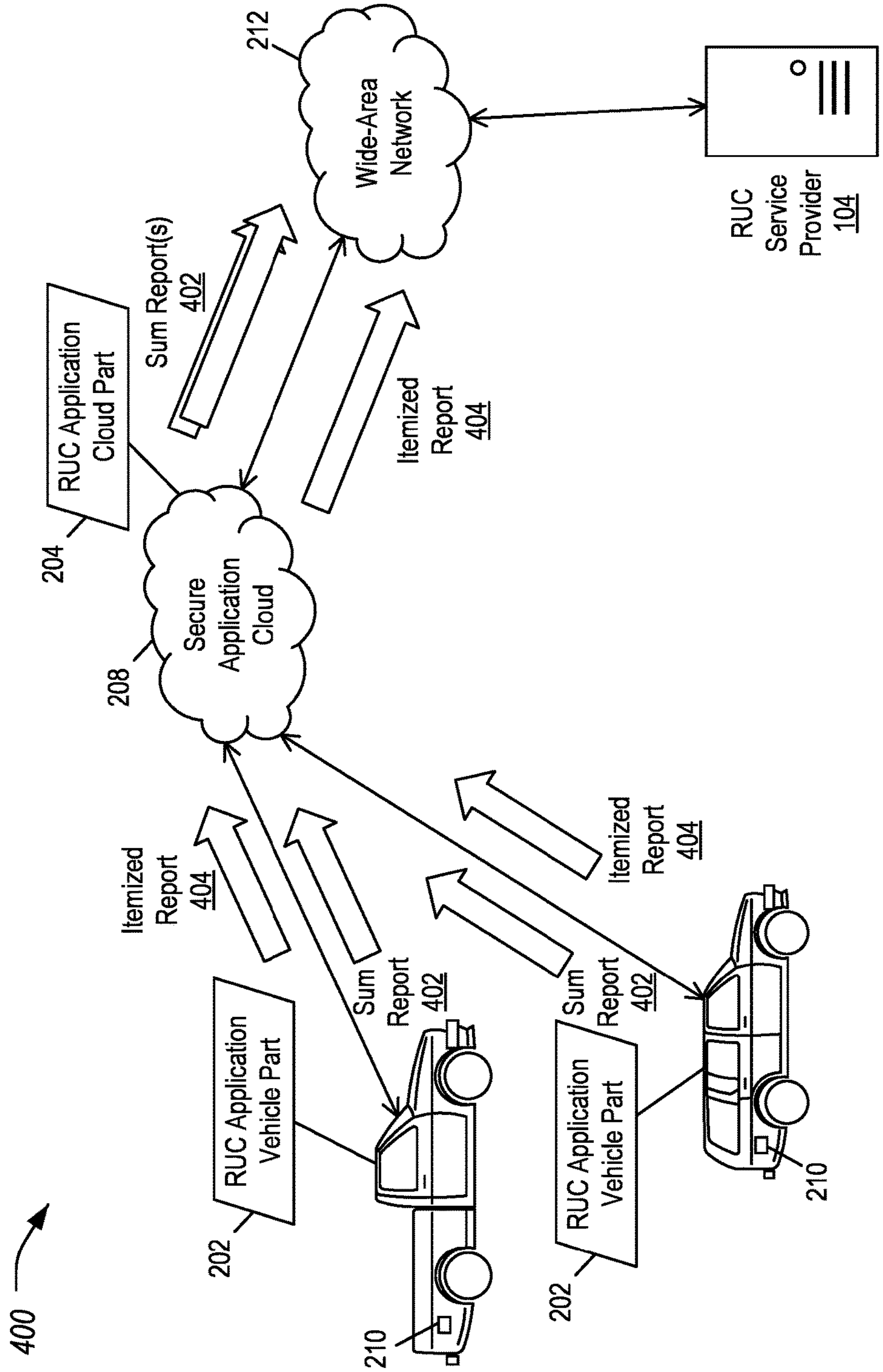
FIG. 4 illustrate an example of using the RUC architecture to increase privacy of the data included in the RUC report.

FIG. 4 illustrate an example 400 of using the RUC architecture 200 to increase privacy of the data included in the RUC report 110. In this example 400, the RUC application cloud part 204 may serve as an aggregator of messages coming from different RUC application vehicle part 202 instances. Each RUC application vehicle part 202 instance may provide a full internal RUC report 110 as indicated in Table 1.

The internal RUC report 110 may include information sufficiently descriptive that it could be used to deconstruct the user's trip pattern. For example, using knowledge of the road geometry of the charge domains, as well as the distance traveled information, a best fit travel path could be reconstructed. Accordingly, the RUC application 102 may instead send two different reports to increase the privacy of the data included in the internal RUC report 110. These reports may include a sum report 402 and an itemized report 404.

The sum report 402 may indicate the total sum owed by each vehicle 206. An example sum report 402 generated by the vehicle 206 is shown in Table 2.

TABLE 2

| Sum Report | |
|---|---|
| User Account Identifier | X |
| Amount owed | Σ(X1, X2, . . . , Xn) |

The itemized report 404 may indicate amounts owed to each of the RUC chargers 106 for the vehicle 206. The itemized report 404 may optionally also provide the distance traveled within the area served by each of the RUC chargers 106 for the vehicle 206. An example itemized report 404 is shown in Table 3.

TABLE 3

| Itemized Report | | |
|---|---|---|
| User Account<br>Charge Domain | Anonymous or X<br>Amount owed | Distance traveled |
| C1 | X1 | M1 |
| C2 | X2 | M2 |
| . . . | . . . | . . . |
| Cn | Xn | Mn |

The RUC application 102 may provide the itemized report 404 to the RUC service provider 104 with either (i) the account identifier (ID) or (ii) anonymized without account ID and only the signature which validates that the message is coming from a valid account holder but otherwise anonymized. If the RUC application 102 opts to provide itemized report 404 with its own ID, the RUC application 102 does not also need to send the sum report 402. Whether the itemized report 404 or the itemized report 404 and the sum report 402 are sent, these messages may be provided at a certain cadence determined by events such as: timeout (e.g., every day/week/month), every time the sum of miles traveled since the last report exceeds a threshold or every time a sum owed since the last report exceeds a threshold.

Figure 5:
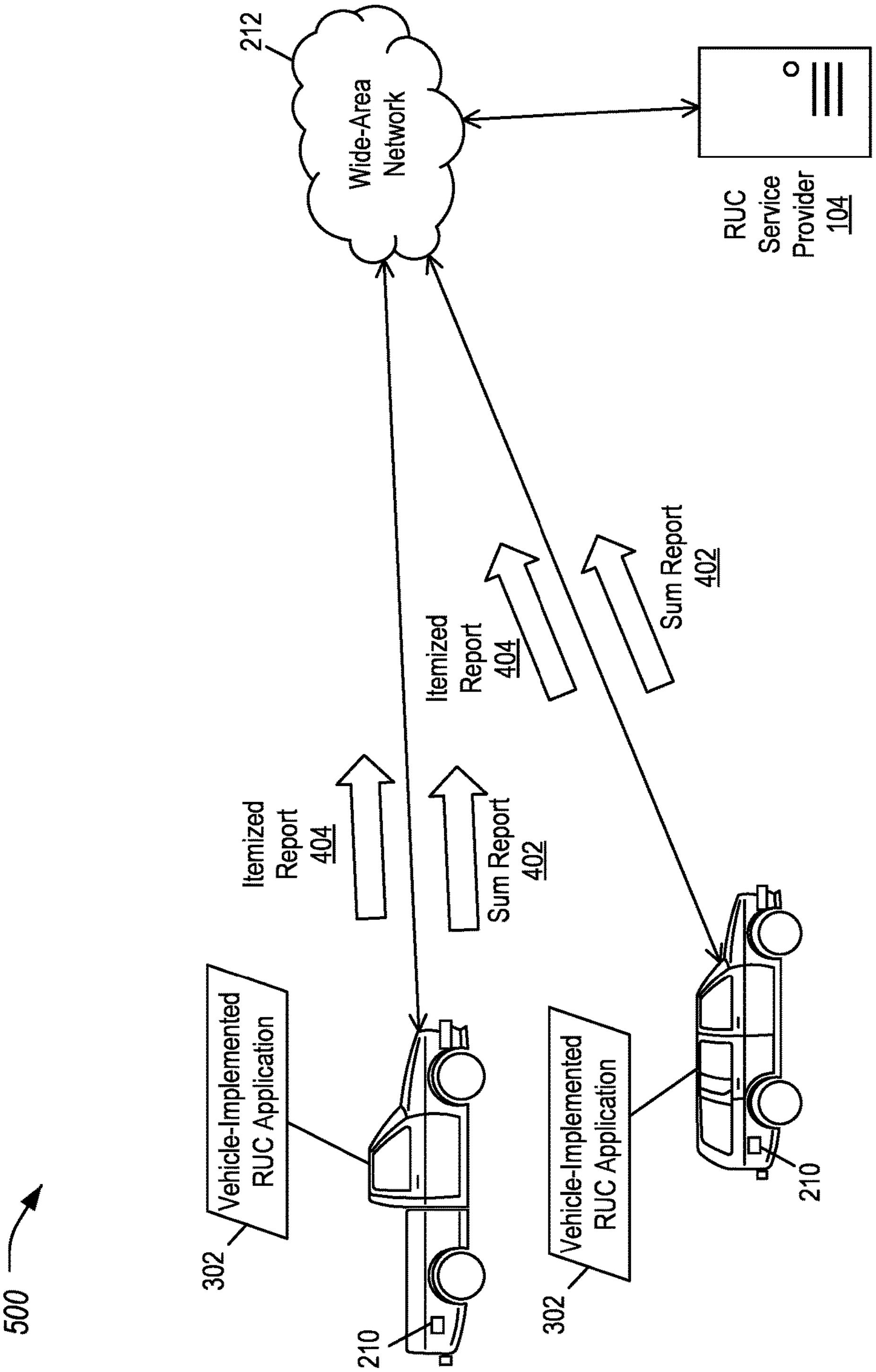
FIG. 5 illustrate an example of using the RUC architecture of FIG. 3 to increase privacy of the data included in the internal RUC report, without requiring use of the RUC application cloud part or the secure application cloud.

FIG. 5 illustrate an example 500 of using the RUC architecture 300 of FIG. 3 to increase privacy of the data included in the internal RUC report 110, without requiring use of the RUC application cloud part 204 or the secure application cloud 208. As opposed to the example 400, in the example 500 the vehicle-implemented RUC application 302 sends the sum report 402 and the itemized report 404 to the RUC service provider 104, without utilizing the services of the secure application cloud 208 as an intermediary.

Figure 6:
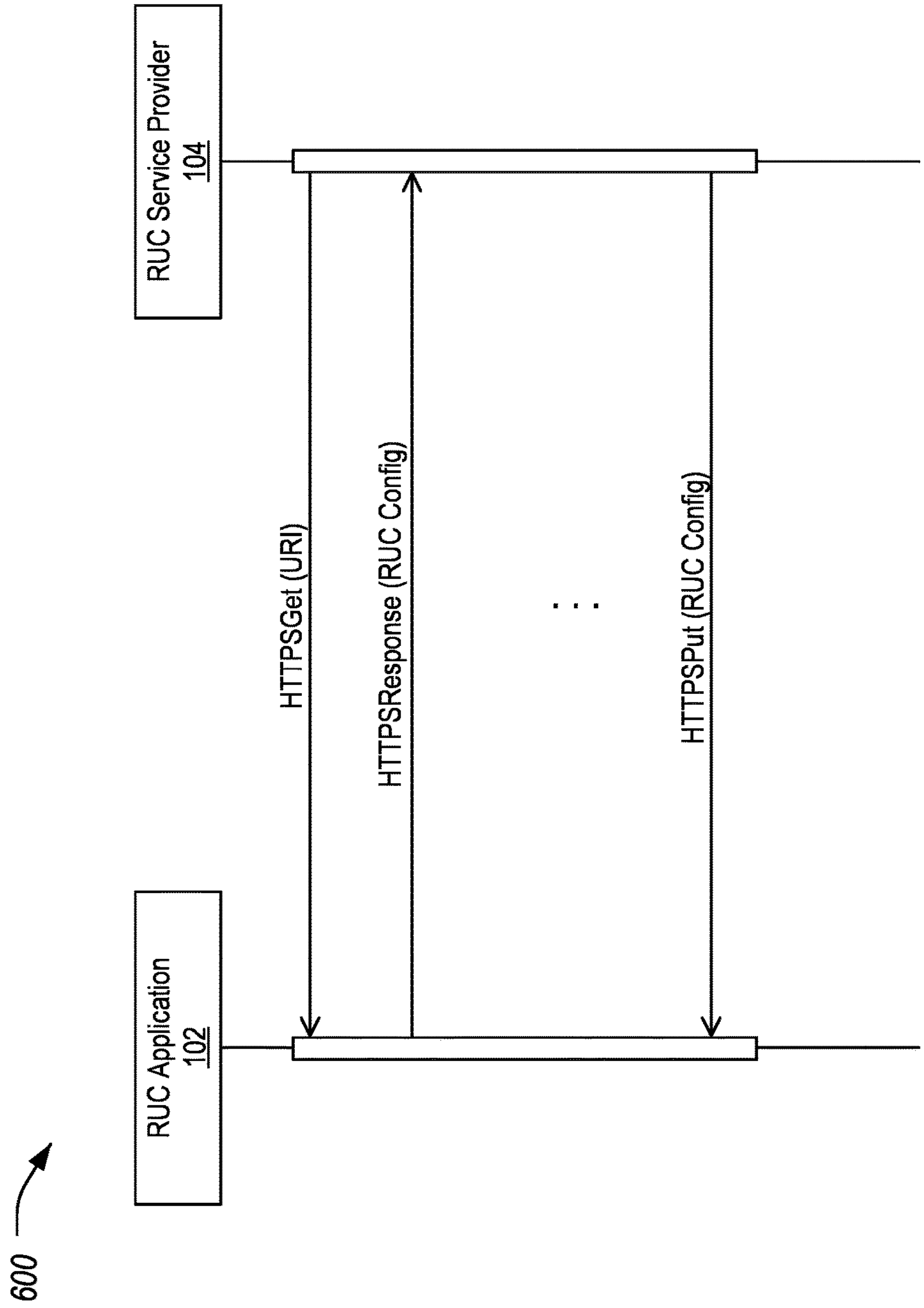
FIG. 6 illustrates an example data flow diagram of the communication between the RUC application and the RUC service provider.

FIG. 6 illustrates an example 600 data flow diagram of the communication between the RUC application 102 and the RUC service provider 104. In the example 600, a client server model and hypertext transfer protocol (HTTP) or hypertext transfer protocol secure (HTTPS) application transport protocols are utilized. Significantly, these messages are sent between the vehicle 206 and a URI of the RUC service provider 104.

This example 600 illustrates both the transmission of map and fees information 108 from the RUC service provider 104 to the RUC application 102 as well as the transfer of sum reports 402 and/or itemized reports 404 from the RUC application 102 to the RUC service provider 104. The client server architecture is particularly convenient since it allows the RUC application 102 to contact the RUC service provider 104 at its leisure to either request information or to provide information.

Figure 7:
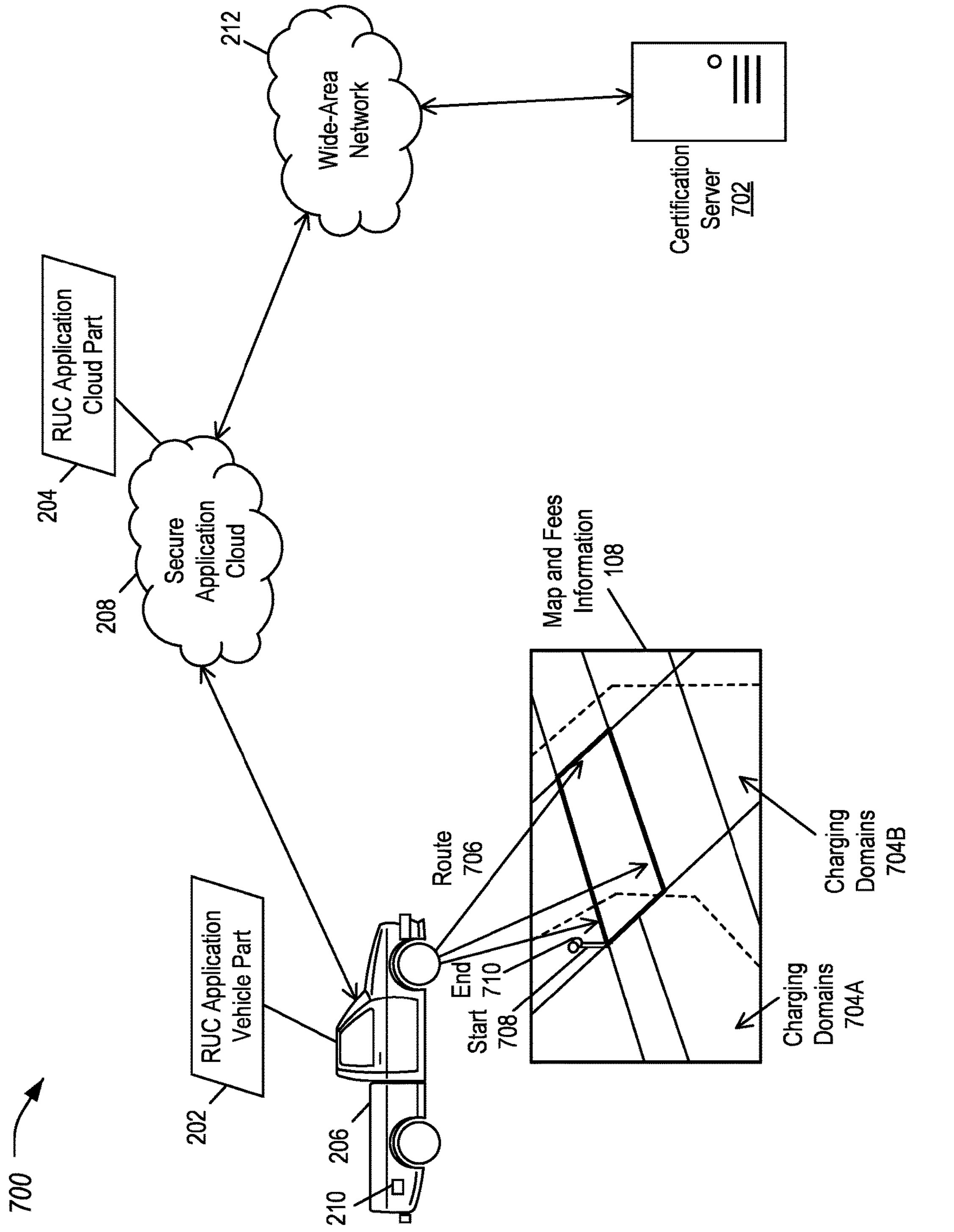
FIG. 7 illustrates an example of a certification approach in which a vehicle provides a certification server with reporting of a route across multiple charging domains.

FIG. 7 illustrates an example 700 of a certification approach in which a vehicle 206 provides a certification server 702 with reporting of a route 706 across multiple charging domains 704. As shown, the route 706 includes segments within changing domain 704A and segments within changing domain 704B. The certification server 702 may takes the role of the RUC service provider 104 server and may follow the agreed protocol between the RUC application 102 and the RUC service provider 104. A purpose of this validation is to certify that the RUC application 102 is functioning properly.

The certification server 702 may be a server that is used to validate the sum reports 402 and/or itemized reports 404 for a defined route 706 based on defined map and fees information 108. In some cases, the certification server 702 may have a different URI than that of the RUC service provider 104. This may allow the sum reports 402 and/or itemized reports 404 from the RUC application 102 to be provided to a testing environment as opposed to being provided to a production RUC service providers 104 that may utilize testing reports for charging.

The map and fees information 108 may include information descriptive of the fees owed per charging area and/or charging domain 704 that the vehicle 206 may traverse. In the illustrated example, two such charging domains 704 are indicated—the changing domain 704A to the left of the changing domain 704B.

The route 706 may be a defined path across the road segments of the map and fees information 108. As shown the route 706 may be specified from a start location 708 to an end location 710. In this case, the route 706 is a round trip, but that is only one possibility. In some cases, supervision may be necessary to ensure that the vehicle 206 under test is following the test route 706.

Using the map and fees information 108, the vehicle 206 may traverse the route 706 and compute the sum report 402 and/or the itemized report 404. These reports may be sent to the certification server 702. As the route 706 and the map and fees information 108 may be available to the certification server 702, the certification server 702 may be able to verify if the RUC application 102 computed the sum report 402 and/or the itemized report 404 correctly.

Figure 8:
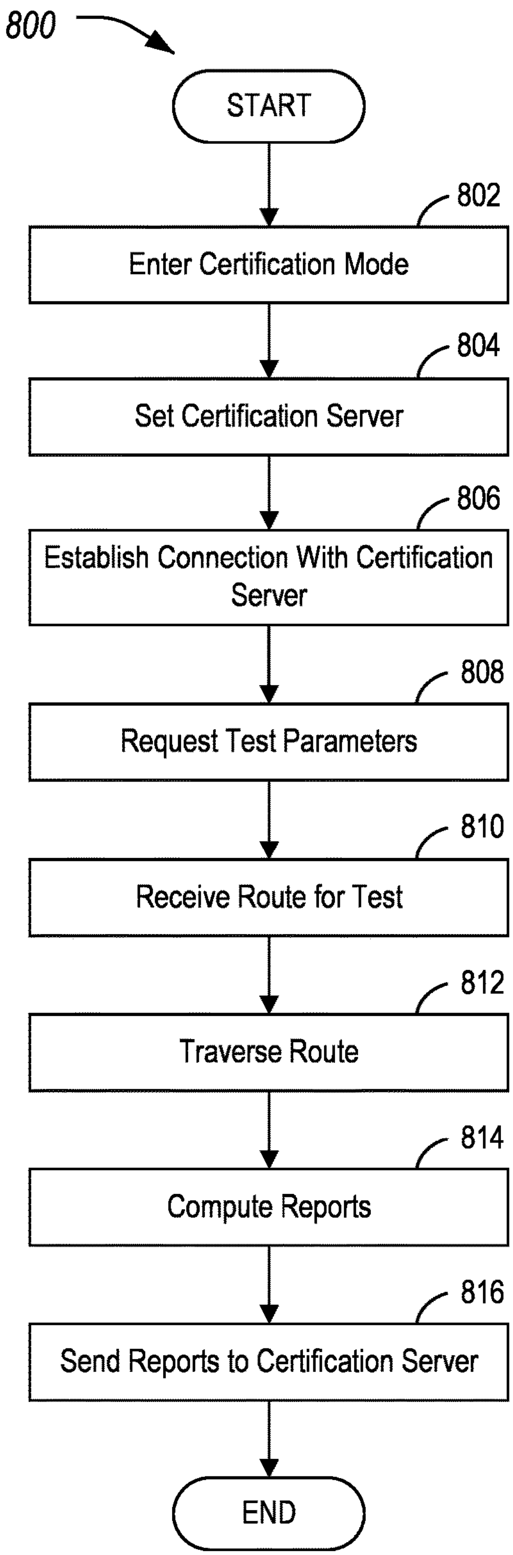
FIG. 8 illustrates an example process for certifying the RUC application at a test facility.

FIG. 8 illustrates an example process 800 for certifying the RUC application 102 at a test facility. In the process 800, it is verified whether the RUC application 102 is functioning properly in a test environment. This may demonstrate that for a predefined route 706 and charging domains 704 with defined map and fees information 108, the RUC application 102 may correctly (within defined accuracy) report total fee as well as the fees per each domain. In an example, the process 800 may be initiated responsive to the vehicle 206 arriving at a certification center or location.

At operation 802, the vehicle 206 enters the certification mode. In an example, RUC application 102 may include an option to put the RUC application 102 in the certification mode. At operation 804, the vehicle 206 receives the URI of the certification server 702. In an example, the RUC application 102 may also include an option to receive the URI of the certification server 702. An example HMI for placing the RUC application 102 into the certification mode is shown in FIG. 9.

Figure 9:
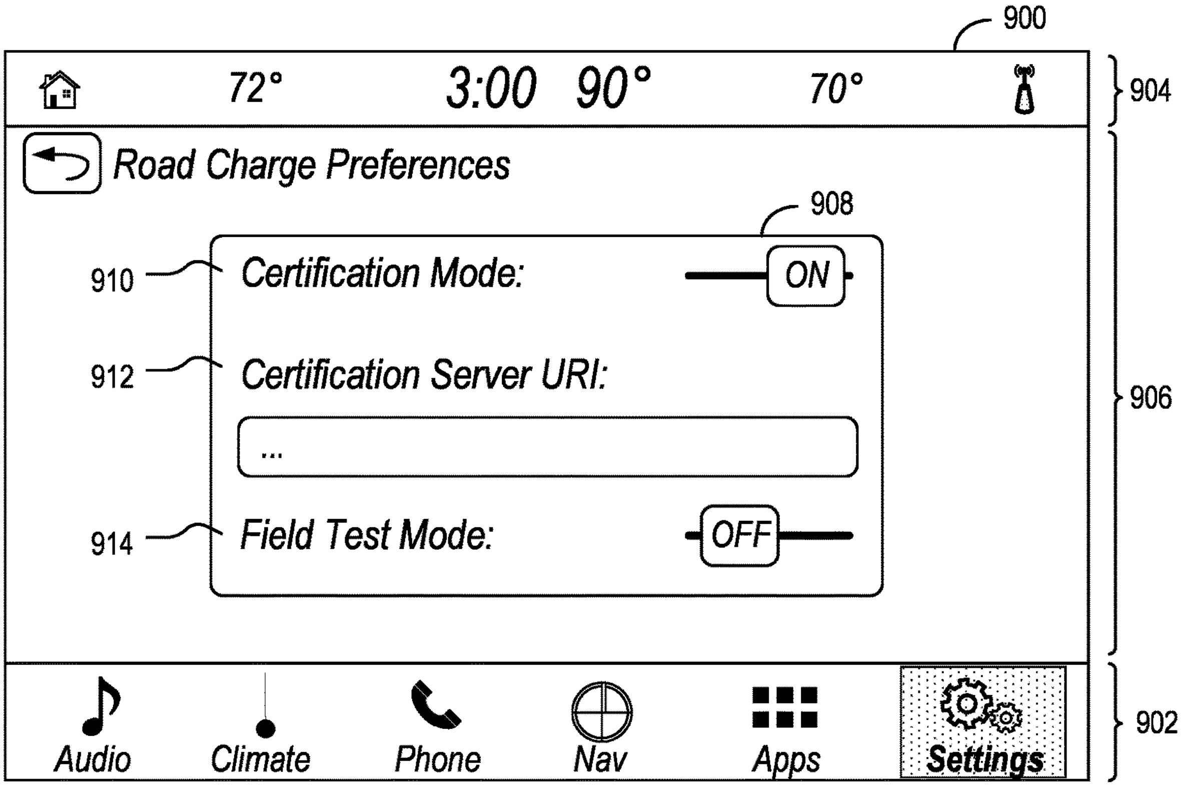
FIG. 9 illustrates an example HMI for the configuration of the vehicle into a certification mode.

FIG. 9 illustrates an example HMI 900 for the configuration of the vehicle 206 into a certification mode. In an example, the HMI 900 may be displayed on a head unit or other screen of the vehicle 206.

As shown, the HMI 900 includes a category listing 902 of one or more screens of content to be displayed in a main screen area 906. As some examples, the category listing 902 may include an audio screen from which configuration of vehicle 206 audio settings may be performed, a climate control screen from which vehicle 206 climate control settings may be configured, a phone screen from which calling services may be utilized, a navigation screen from which maps and routing may be performed, an applications screen from which installed applications may be invoked, and a settings screen from which backlighting or other general settings may be accessed. The HMI 900 may also include a general information area 904 from which time, current temperature, and other information may remain visible to the user, regardless of the specific screen or application that is active in the main screen area 906.

The main screen area 906 may show summary content from multiple of the categories of content. In an example, the main screen area 906 may display an audio summary indicating a reduced version of the content displayed when the audio settings are selected, and a phone summary indicating a reduced version of the content displayed when the phone settings are selected.

The HMI 900 may be displayed, for example, responsive to user selection of the RUC settings from a settings screen displayed upon selection of the settings screen from the category listing 902. As shown, the HMI 900 provides a set of configurable options 908 displayed to the main screen area 906 that may be used by a user to adjust the settings of the RUC functionality. The configurable options 908 may include a certification mode toggle setting 910, a certification URI input setting 912, and a field test mode toggle setting 914.

The certification mode toggle setting 910 may allow the user to choose whether to perform testing of the RUC application 102. When deselected, the RUC application 102 may be configured to communicate with the RUC service provider 104. When selected the RUC application 102 may be configured to communicate with the certification server 702 whose URI is entered into the certification URI input setting 912. In some examples, a password or other credential may be required to be input into the HMI 900 to allow the certification mode toggle setting 910 to be set to certification mode. In some examples, a password or other credential may be required to be input into the HMI 900 to allow access to the configurable options 908 of the HMI 900 generally.

The field test mode toggle setting 914 may be selected to allow the user to select to perform a field test. Further aspects of the field test mode toggle setting 914 are discussed below with respect to the process 1300.

Referring back to FIG. 8, at operation 806, the vehicle 206 establishes a connection with the certification server 702. For instance, similar to as shown in FIG. 6, using the certification URI instead of the URI of the RUC service provider 104, the vehicle 206 may connect to the certification server 702.

At operation 808, the vehicle 206 requests test parameters from the certification server 702. These test parameters may include, in an example, map and fees information 108 defining various charging domains 704. The RUC application 102 may already be maintaining some map information, e.g., for navigation, so the additional test information provided by the RUC service provider 104 may include additional information that can be layered on top of the existing map in the RUC application 102. For instance, the test parameters may include pricing for traversal of road segments within each charging domain 704 (e.g., $0.11/mile between Sam-5 pm for charging domain 704X). In another example, the test parameters may also include a reporting cadence (e.g., every 30 minutes) for the vehicle 206 to provide updates on the travel of the vehicle 206.

At operation 810, the vehicle 206 receives the route 706 for the test. In an example, the certification server 702 may provide the route 706 to the vehicle 206 as a path for which the certification server 702 has already computed an expected charge. The route 706 may include various aspects to be tested. For instance, the route 706 may include various zones, sub-zones, and/or corridors to be tested to ensure that the vehicle 206 produces the correct reports. In some examples, the vehicle 206 may be requested to complete the traversal of the route 706 within a predefined time period.

At operation 812, the vehicle 206 traverses the route 706. For instance, the vehicle 206 may utilize its navigation functionality to proceed to the beginning of the route 706, follow the route 706, and complete the route 706. In the example of an autonomous vehicle 206, the routing may be performed automatically by the vehicle 206. In the example of a semi-autonomous or driven vehicle 206, the user of the vehicle 206 may perform some or all aspects of the controlling of the vehicle 206. The vehicle 206 may track information for use in performing the reporting. For instance, this information may include the internal RUC report 110, the road segments traveled by the vehicle 206, as well as other information, such as distance traveled, charges incurred according to the map and fees information 108, etc. The user interface of the vehicle 206 may also be used to aid in the traversal of the route 706.

Figure 10:
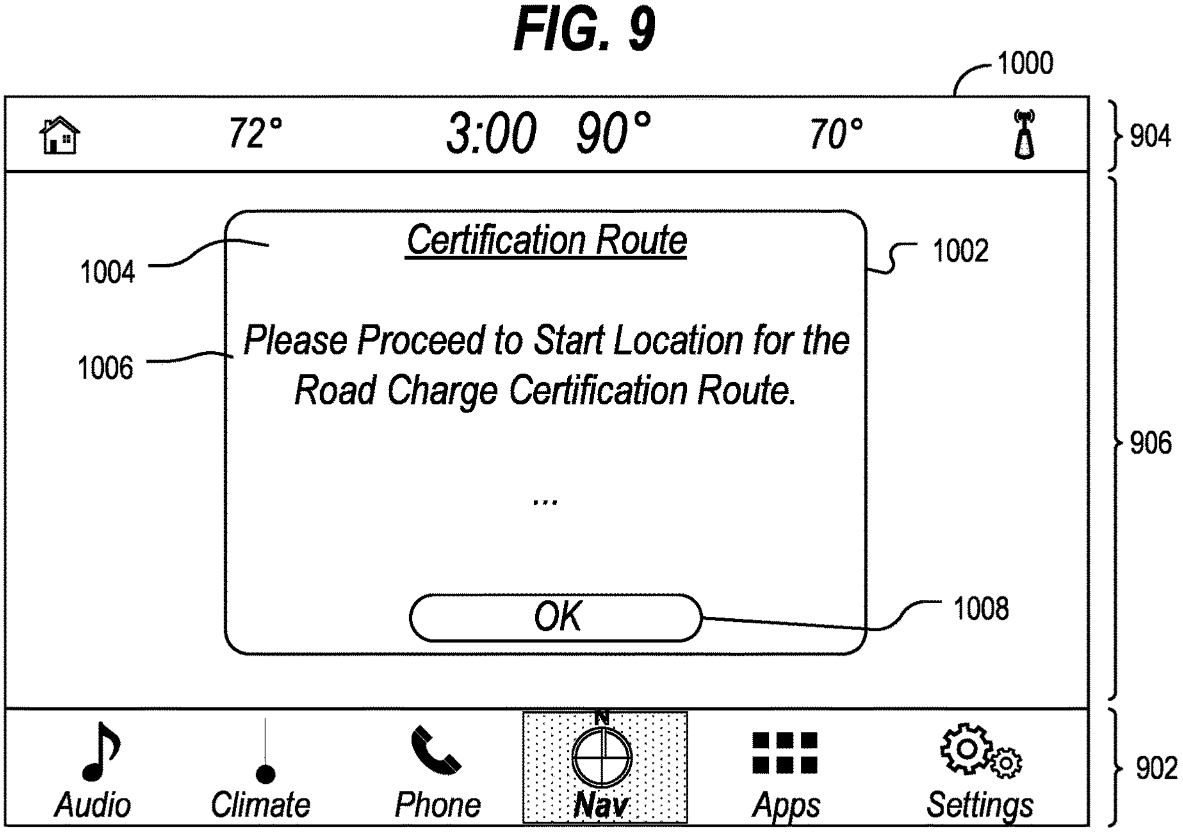
FIG. 10 illustrates an example HMI illustrating an alert for the vehicle in the certification mode to proceed to the start location of the route.

FIG. 10 illustrates an example HMI 1000 illustrating an alert 1002 for the vehicle 206 in the certification mode to proceed to the start location 708 of the route 706. In an example, the HMI 1000 may be displayed on a head unit or other screen of the vehicle 206. As shown, the alert 1002 includes a title 1004 indicating that the alert 1002 is related to RUC application 102, and a message 1006 indicating that the user is to proceed to the start location 708. The message 1006 may further specify the start location 708. In another possibility, the navigation functionality of the vehicle 206 may be used to map and/or direct the vehicle 206 to the start location 708. In such an example the alert 1002 may instead take the form of an automatic navigation to the start location 708. The alert 1002 may further include a control 1008 that, when selected by the user, causes the alert 1002 to be dismissed. The alert 1002 may also automatically dismiss if the user reaches the start location 708.

Figure 11:
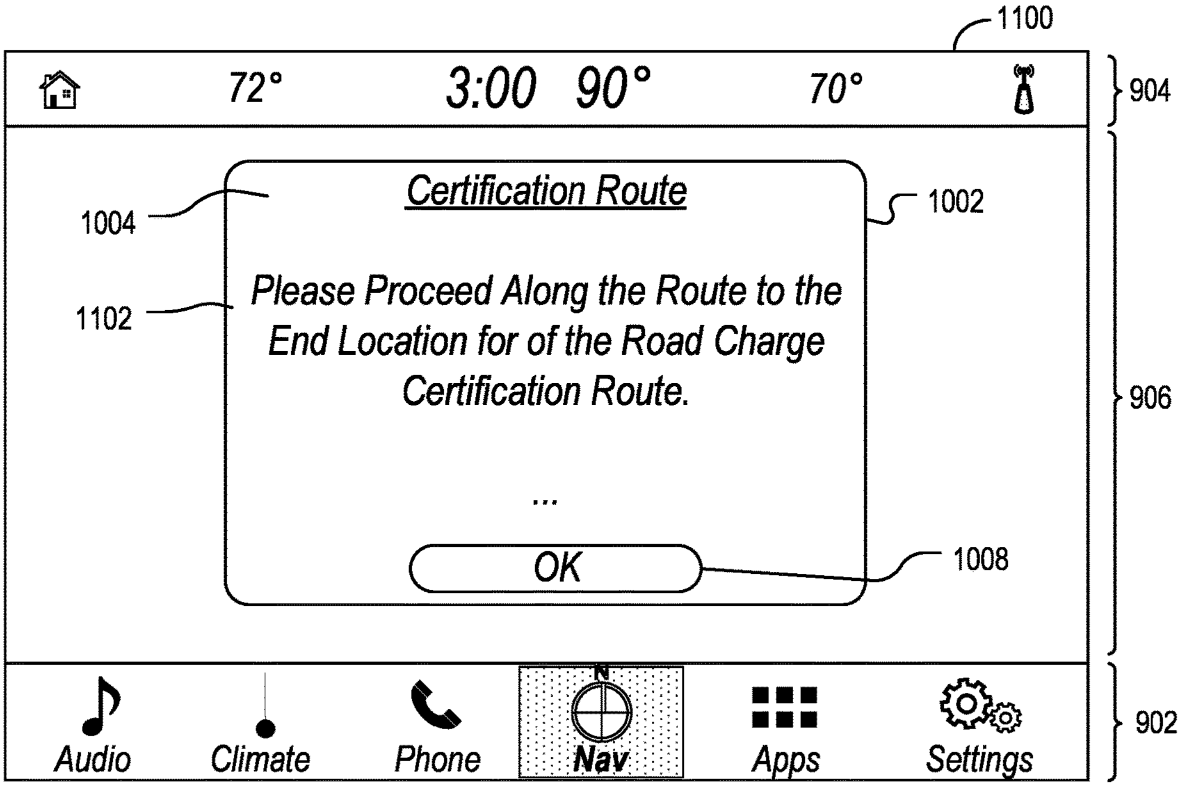
FIG. 11 illustrates an example HMI illustrating the alert for the vehicle in the certification mode to proceed to the end location of the route.

FIG. 11 illustrates an example HMI 1100 illustrating the alert 1002 for the vehicle 206 in the certification mode to proceed to the end location 710 of the route 706. As with the HMI 1000, the HMI 1000 may be displayed on a head unit or other screen of the vehicle 206. As compared to the example HMI 1000, here the message 1006 may specify or otherwise direct travel to the end location 710.

Figure 12:
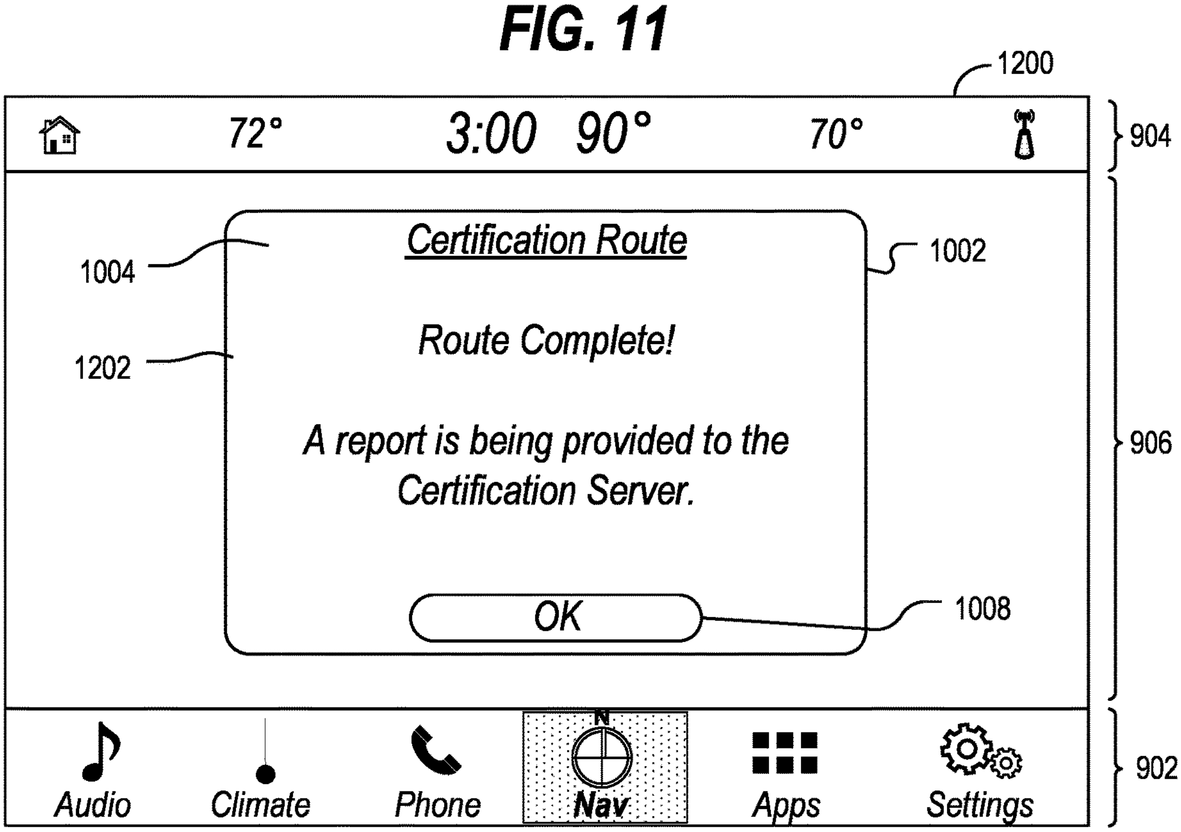
FIG. 12 illustrates an example HMI illustrating the alert for the vehicle in the certification mode showing completion of the route.

FIG. 12 illustrates an example HMI 1200 illustrating the alert 1002 for the vehicle 206 in the certification mode showing completion of the route 706. As with the HMI 1000, the HMI 1000 may be displayed on a head unit or other screen of the vehicle 206. As compared to the example HMIs 1000 and 1100, here the message 1006 indicates to the user that the route 706 is completed, and the RUC application 102 may according report the results to the certification server 702.

Referring back to FIG. 8, at operation 814 the vehicle 206 computes the reports. This may include the sum report 402 and/or the itemized report 404, as discussed in detail above. At operation 816, the vehicle 206 sends the reports to the certification server 702. For instance, the RUC application 102 may send the sum report 402 and/or the itemized report 404 to the certification server 702 in accordance with the cadence specified in the received test parameters. The certification server 702 may receive the reports and may validate the included information as matching the expected toll amount. The certification server 702 may also validate that the reports are received with the specified cadence. After operation 814, the process 800 ends.

Variations on the process 800 are possible. In one variation, instead of using the HMI 900 for operations 802-804, the interface between the certification server 702 and the RUC application cloud part 204 (in view of the architecture of FIG. 2) may be utilized to request the certification mode for a particular vehicle 206 (e.g., the vehicle 206 being specified by VIN or another identifier of the vehicle 206). Additionally, the RUC application cloud part 204 may also provide the URI to the RUC application cloud part 204 together with whatever identifier of the vehicle 206 to be configured. For instance, the RUC application cloud part 204 may instruct the vehicle 206 to enter the certification mode with a given URI. This interface may be achieved through various approaches, for example through a publish/subscribe mechanism in which the RUC service provider 104 (or certification server 702) publishes a new state to the vehicle 206 or requests the vehicle 206 to contact the RUC application cloud part 204 to retrieve the test parameters.

Figure 13:
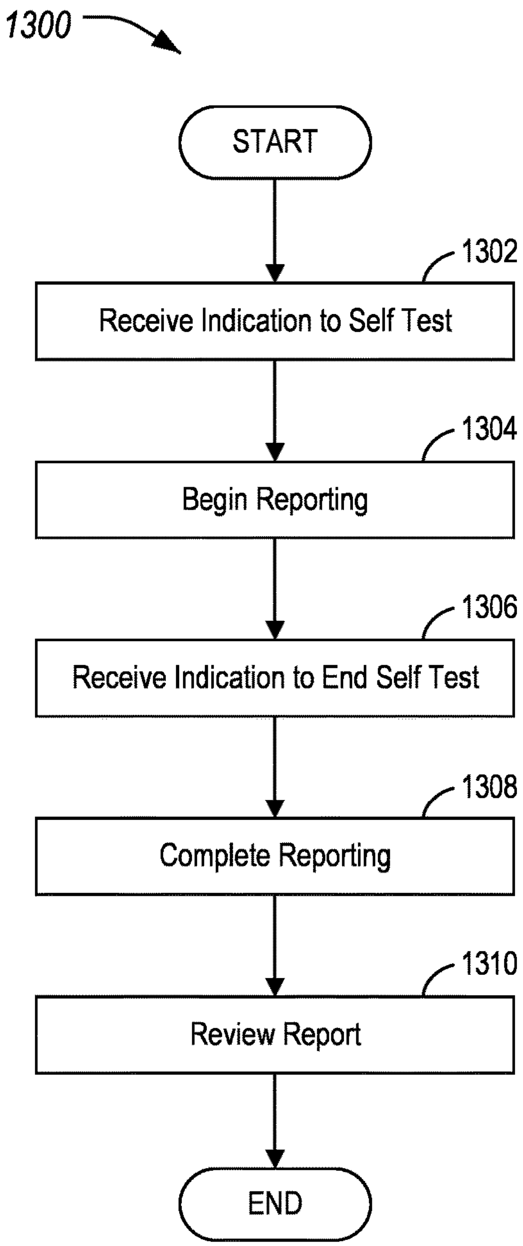
FIG. 13 illustrates an example process for third party testing of the RUC application in in a field test mode.

FIG. 13 illustrates an example process 1300 for third party testing of the RUC application 102 in a field test mode. In an example, as with the process 800, the process 1300 may be performed by the vehicle 206 in the context of the system 100. However, as compared to the process 800, in the process 1300 the certification server 702 is not utilized. Instead, the vehicle 206 may remain in communication with the RUC service provider 104.

At operation 1302, the vehicle 206 receives an indication to self-test. In an example, the vehicle 206 may include an option in the navigation system to allow a user to initiate the self-test.

Figure 14:
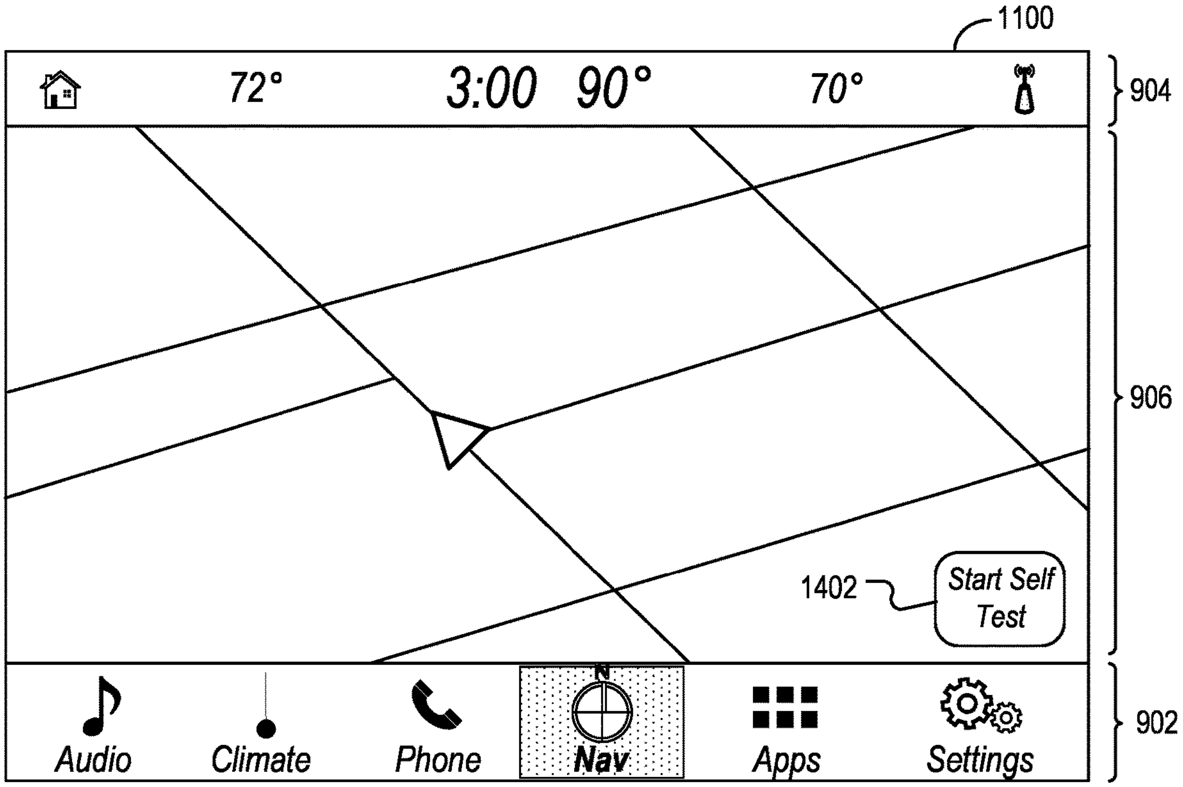
FIG. 14 illustrates an example HMI including a begin self-test control for initiating a test in the field test mode.

FIG. 14 illustrates an example HMI 1400 including a begin self-test control 1402 for initiating a test in the field test mode. In an example, the HMI 1400 may be displayed on a head unit or other screen of the vehicle 206. As shown, the begin self-test control 1402 indicates that it may be pressed to allow a user, such as a 3rd party auditor, to enter an arbitrary vehicle 206, the begin self-test control 1402, and drive along a predefined route 706. The begin self-test control 1402 may be pressed by the user if the vehicle 206 is stationary or, in other examples, while the vehicle 206 is in motion.

While not shown, a password or other authentication may be required to be performed to allow the user to begin a self-test. As one possibility, the begin self-test control 1402 may only be shown in the navigation view after the user has authenticated as being authorized to perform self-tests. In another possibility, the begin self-test control 1402 may be made available regardless, to allow the user to confirm proper operation of the RUC application 102.

At operation 1308, the vehicle 206 begins reporting for the self-test. For instance, the vehicle 206 may track information for generation of an internal RUC report 110, such as the road segments traveled by the vehicle 206, as well as other information, such as distance traveled, charges incurred according to the map and fees information 108, etc.

Significantly, this information for the self-test may be tracked by the vehicle 206 independent of any tracking done in performance of regular RUC services. Instead, the tracking for the self-test may be a parallel action that takes place.

At operation 1310, the vehicle 206 completed reporting for the self-test. In an example, the vehicle 206 may include an option in the navigation system to allow a user to conclude the self-test.

Figure 15:
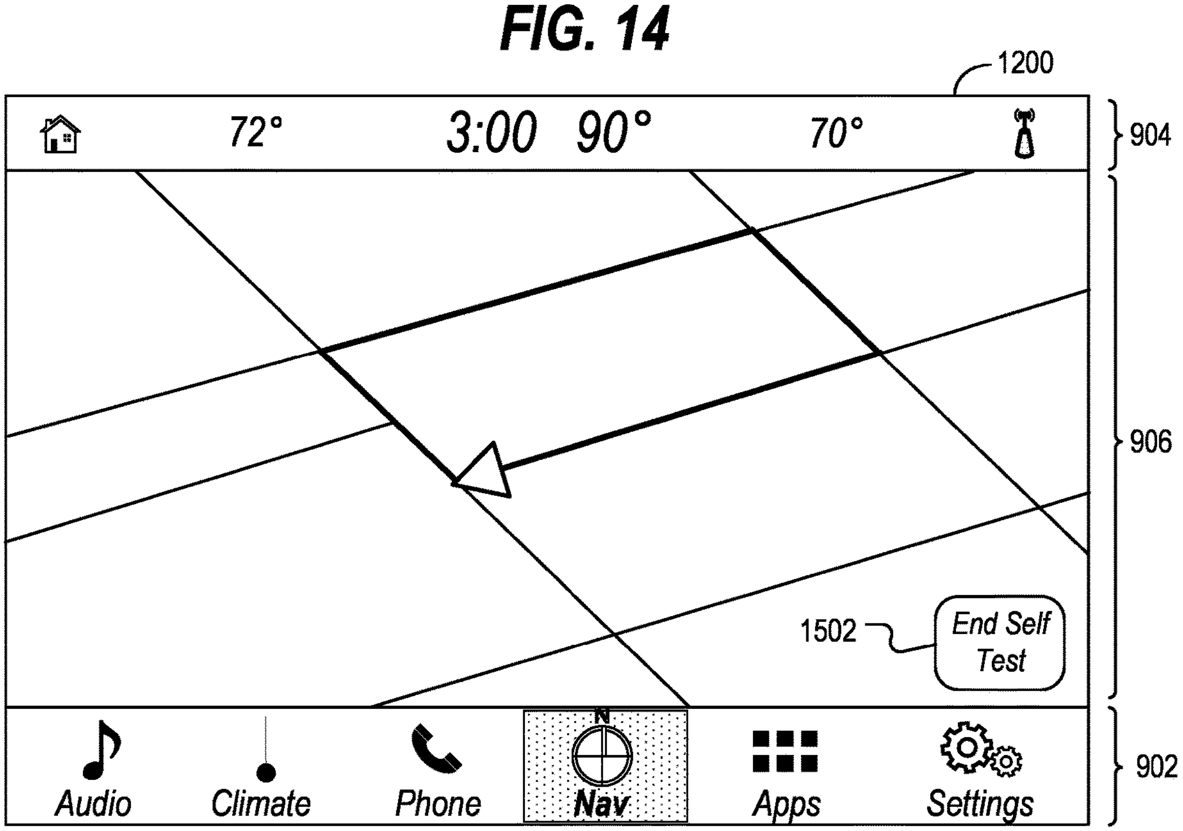
FIG. 15 illustrates an example HMI including an end self-test control for concluding a test in the field test mode; and systems.

FIG. 15 illustrates an example HMI 1500 including an end self-test control 1502 for concluding a test in the field test mode. In an example, the HMI 1500 may be displayed on a head unit or other screen of the vehicle 206 during the self-test. As shown, the end self-test control 1502 indicates that it may be pressed to allow the user to complete the self-test. The end self-test control 1502 may be pressed by the user if the vehicle 206 is stationary or, in other examples, while the vehicle 206 is in motion.

At operation 1312, the vehicle 206 saves the self-test reports for review. These self-test reports may be maintained to a memory or storage of the vehicle 206 and may be verified by the vehicle 206 or offloaded to another system for verification. In another example, the self-test reports may be displayed to the HMI of the vehicle 206 to allow the user to visually review the self-test report from the vehicle 206 itself. For instance, the self-test report may be shown as an itemized report 404, similar to that of Table 3. Significantly, the self-test report is not sent to the RUC service provider 104. After operation 1312, the process 1300 ends.

Other variations on the processes 800 and 1300 are possible. In addition to the approaches described above, the RUC application 102 may be tested other ways. For instance, a party requiring the RUC application 102 to be tested may advertise a URI to the vehicle 206 to request an itemized report 404 for a hypothetical trip. Or, the party may directly request the test to be performed through the HMI of the vehicle 206. The RUC application 102 may, in an offline mode, simulate traversal of the route 706 by computing the miles travelled on a given trip and applying the pricing information specified by the map and fees information 108 received from the RUC service provider 104. Such a simulation may include simulating both the traversed route and the pricing scheme to determine the fees. This report may be produced on the vehicle or sent to a specific client that requests it. Such a test may accordingly be used to understand the tax implications of a particular trip and may not be associated with any particular account ID.

In yet another variation, another embodiment of validation may include leveraging existing toll gantries on a traversed route to validate that the vehicle 206 indeed passed through these for RUC application 102. Toll gantry operator can tally any crossings of the vehicle 206 with RUC chargers 106 when both entities (i.e. toll charger and RUC charger 106) are mutually or partially independent.

Figure 16:
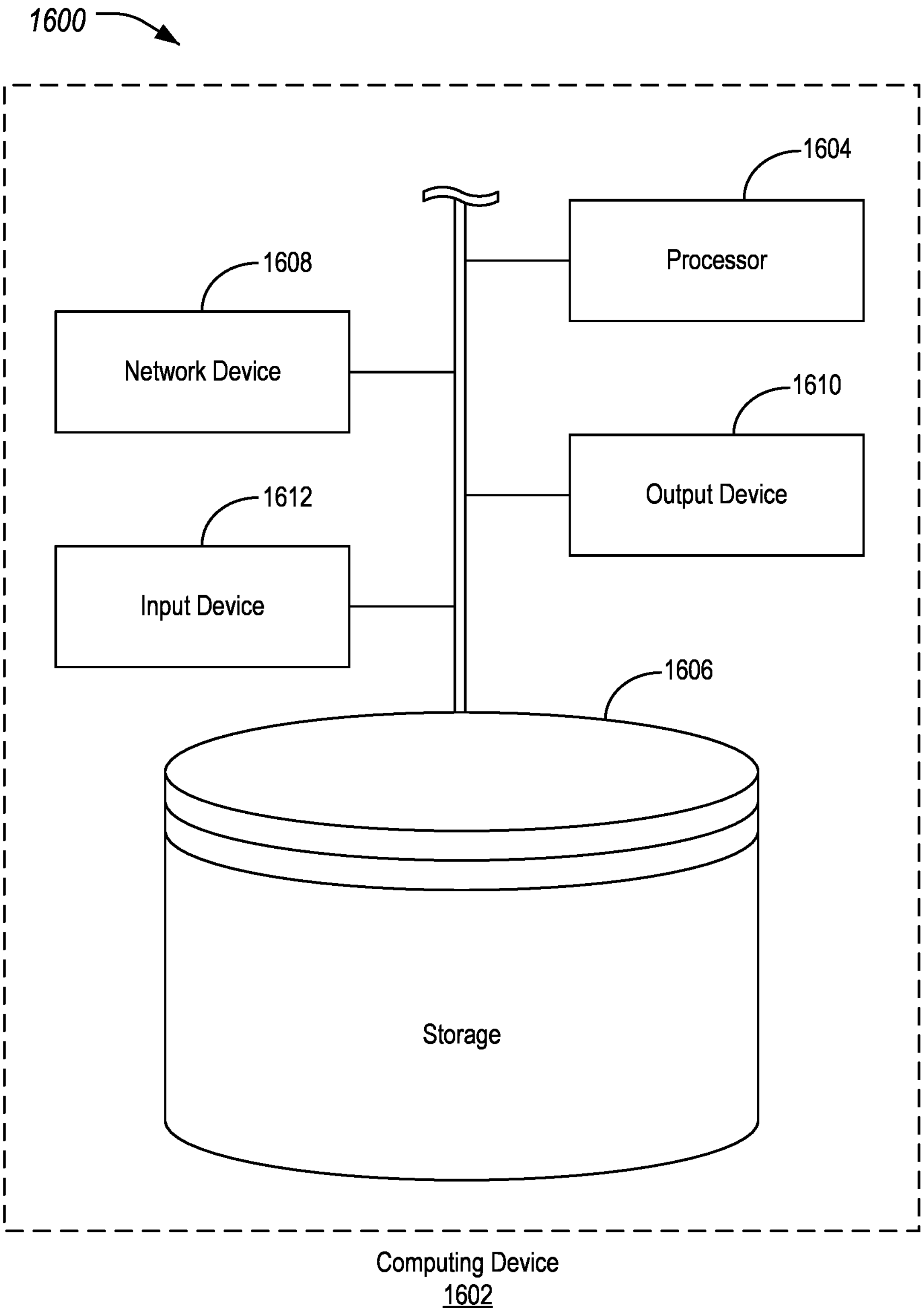
FIG. 16 illustrates an example of a computing device for use validation of RUC

FIG. 16 illustrates an example 1600 of a computing device 1602 for use in validation of RUC systems. Referring to FIG. 16, and with reference to FIGS. 1-13, the RUC service provider 104, RUC charger 106, vehicle 206, secure application cloud 208, TCU 210, wide-area network 212, etc., may include examples of such computing devices 1602. As shown, the computing device 1602 may include a processor 1604 that is operatively connected to a storage 1606, a network device 1608, an output device 1610, and an input device 1612. It should be noted that this is merely an example, and computing devices 1602 with more, fewer, or different components may be used.

The processor 1604 may include one or more integrated circuits that implement the functionality of a central processing unit (CPU) and/or graphics processing unit (GPU). In some examples, the processors 1604 are a system on a chip (SoC) that integrates the functionality of the CPU and GPU. The SoC may optionally include other components such as, for example, the storage 1606 and the network device 1608 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stages (MIPS) instruction set families.

Regardless of the specifics, during operation the processor 1604 executes stored program instructions that are retrieved from the storage 1606. The stored program instructions, accordingly, include software that controls the operation of the processors 1604 to perform the operations described herein. The storage 1606 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 1610. The output device 1610 may include a graphical or visual display device, such as an electronic display screen, projector, printer, or any other suitable device that reproduces a graphical display. As another example, the output device 1610 may include an audio device, such as a loudspeaker or headphone. As yet a further example, the output device 1610 may include a tactile device, such as a mechanically raisable device that may, in an example, be configured to display braille or another physical output that may be touched to provide information to a user.

The input device 1612 may include any of various devices that enable the computing device 1602 to receive control input from users. Examples of suitable input devices that receive human interface inputs may include keyboards, mice, trackballs, touchscreens, voice input devices, graphics tablets, and the like.

The network devices 1608 may each include any of various devices that enable the TCU 210, secure application cloud 208, RUC service provider 104, and RUC charger 106 to send and/or receive data from external devices over networks (such as the wide-area network 212). Examples of suitable network devices 1608 include an Ethernet interface, a Wi-Fi transceiver, a cellular transceiver, a satellite transceiver, a vehicle-to-everything (V2X) transceiver, a BLUETOOTH or BLUETOOTH low energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle for performing validation of road usage charging (RUC) systems comprising:
- a human machine interface (HMI); and
- a hardware processor, programmed to:
  - receive input, from the HMI, to enter into a testing mode in which a test of RUC functionality of the vehicle is to be performed,
  - in the testing mode, compute RUC charges for a route from a start location to an end location, based on map and fees information for the test, and
  - generate one or more reports of the charges for verification of the RUC functionality, the charges being verifiable based on the route and the map and fees information defined for the test.

2. The vehicle of claim 1, wherein the testing mode is a certification mode, and the input to enter into the certification mode includes specification of uniform resource identifier (URI) of a certification server, and the hardware processor is programmed to, in the certification mode, send the one or more reports to the URI of the certification server for validation.

3. The vehicle of claim 2, wherein the map and fees information for the test is received at the vehicle from the certification server.

4. The vehicle of claim 2, wherein the one or more reports are provided to the certification server in accordance with a cadence specified by the certification server.

5. The vehicle of claim 1, wherein the testing mode is a field test mode, the input to enter into the field test mode is receipt of a press of a begin self-test control, a second input to complete the field test mode includes receipt of a press of an end self-test control, and the hardware processor is programmed toy:
- in the field test mode, refrain from sending the one or more reports resulting from the test of RUC functionality to a RUC service provider; and
- not in the field test mode, send the one or more reports resulting from the test of RUC functionality to the RUC service provider.

6. The vehicle of claim 5, wherein the hardware processor is further programmed to one or more of:
- maintain, in the vehicle, a self-test report indicating amounts owed for traversal by the vehicle of road segments during the field test mode, instead of being provided to the RUC service provider as performed when not in the field test mode; or
- display the self-test report on the HMI of the vehicle.

7. The vehicle of claim 1, wherein the route is received by the HMI.

8. The vehicle of claim 1, wherein the route traverses a plurality of charging domains, and the one or more reports include an itemized report, the itemized report indicating amounts owed for traversal by the vehicle of road segments within each of the charging domains.

9. The vehicle of claim 1, wherein the hardware processor is further programmed to utilize the HMI to direct the vehicle to the start location of the route to begin the test, and to further utilize the HMI to direct the vehicle to the end location of the route to complete the test.

10. A method for performing validation of road usage charging (RUC) systems comprising:
- receiving, at a hardware processor of a vehicle, from a human machine interface (HMI) of the vehicle, input to enter into a testing mode in which a test of RUC functionality of the vehicle is to be performed;
- in the testing mode, computing RUC charges for a route from a start location to an end location, based on map and fees information for the test; and
- generating one or more reports of the charges for verification of the RUC functionality, the charges being verifiable based on both the route and also the map and fees information being defined for the test.

11. The method of claim 10, wherein the testing mode is a certification mode, and the input to enter into the certification mode includes specification of uniform resource identifier (URI) of a certification server, and further comprising, in the certification mode, sending the one or more reports to the URI of the certification server for validation.

12. The method of claim 11, wherein the map and fees information for the test is received at the vehicle from the certification server.

13. The method of claim 11, wherein the one or more reports are provided to the certification server in accordance with a cadence specified by the certification server.

14. The method of claim 10, wherein the testing mode is a field test mode, the input to enter into the field test mode is receipt of a press of a begin self-test control, a second input to complete the field test mode includes receipt of a press of an end self-test control, and further comprising:

in the field test mode, refraining from sending the one or more reports resulting from the test of RUC functionality to a RUC service provider; and not in the field test mode, sending the one or more reports resulting from the test of RUC functionality to the RUC service provider.

15. The method of claim 14, further comprising to one or more of:

during the field test mode, maintaining, in the vehicle, a self-test report indicating amounts owed for traversal by the vehicle of road segments during the field test mode, instead of being provided to the RUC service provider as performed when not in the field test mode; or displaying the self-test report on the HMI of the vehicle.

16. The method of claim 10, wherein the route is received by the HMI.

17. The method of claim 10, wherein the route traverses a plurality of charging domains, and the one or more reports include an itemized report, the itemized report indicating amounts owed for traversal by the vehicle of road segments within each of the charging domains.

18. The method of claim 10, further comprising utilizing the HMI to direct the vehicle to the start location of the route to begin the test, and utilizing the HMI to direct the vehicle to the end location of the route to complete the test.

19. A non-transitory computer readable medium comprising instructions for performing validation of road usage charging (RUC) systems that, when executed by a hardware processor of a vehicle, cause the vehicle to perform operations including to:

receive, from a human machine interface (HMI) of the vehicle, input to enter into a testing mode in which a test of RUC functionality of the vehicle is to be performed, the input including specification of a uniform resource identifier (URI) of a certification server;

in the testing mode, compute RUC charges for a route from a start location to an end location, based on map and fees information for the test, wherein the route traverses a plurality of charging domains;

generate one or more reports of the charges for verification of the RUC functionality, the charges being verifiable based on both the route and also the map and fees information being defined for the test, wherein the one or more reports include an itemized report, the itemized report indicating amounts owed for traversal by the vehicle of road segments within each of the charging domains; and send the one or more reports to the URI of the certification server for validation.

* * * * *